United States Patent
Winter et al.

(10) Patent No.: US 10,403,887 B2
(45) Date of Patent: Sep. 3, 2019

(54) BIPOLAR BATTERY ELECTRODE HAVING IMPROVED CARBON SURFACES AND METHOD OF MANUFACTURING SAME

(71) Applicant: Redflow R&D Pty Ltd, Brisbane, Queensland (AU)

(72) Inventors: Alexander Rudolf Winter, Brisbane (AU); Thomas John, Brisbane (AU)

(73) Assignee: Redflow R&D Pty Ltd., Brisbane (AU)

( * ) Notice: Subject to any disclaimer, the term of this patent is extended or adjusted under 35 U.S.C. 154(b) by 79 days.

(21) Appl. No.: 15/120,967

(22) PCT Filed: Feb. 25, 2015

(86) PCT No.: PCT/AU2015/050076
§ 371 (c)(1),
(2) Date: Aug. 23, 2016

(87) PCT Pub. No.: WO2015/127511
PCT Pub. Date: Sep. 3, 2015

(65) Prior Publication Data
US 2016/0380264 A1  Dec. 29, 2016

(30) Foreign Application Priority Data
Feb. 26, 2014 (AU) .............................. 2014900628

(51) Int. Cl.
| | | |
|---|---|---|
| *H01M 4/36* | (2006.01) |
| *H01M 4/62* | (2006.01) |
| *H01M 4/66* | (2006.01) |
| *H01M 4/583* | (2010.01) |
| *H01M 4/04* | (2006.01) |
| *H01M 8/18* | (2006.01) |
| *H01M 8/20* | (2006.01) |
| *H01M 4/02* | (2006.01) |
| *H01M 4/86* | (2006.01) |
| *H01M 4/96* | (2006.01) |
| *H01M 12/08* | (2006.01) |

(52) U.S. Cl.
CPC ............ *H01M 4/366* (2013.01); *H01M 4/02* (2013.01); *H01M 4/043* (2013.01); *H01M 4/0404* (2013.01); *H01M 4/583* (2013.01); *H01M 4/625* (2013.01); *H01M 4/668* (2013.01); *H01M 4/8631* (2013.01); *H01M 4/96* (2013.01); *H01M 8/188* (2013.01); *H01M 8/20* (2013.01); *H01M 12/085* (2013.01); *H01M 2004/029* (2013.01); *Y02E 60/128* (2013.01)

(58) Field of Classification Search
CPC ...... H01M 4/366; H01M 4/668; H01M 4/583; H01M 4/625; H01M 4/043; H01M 4/96
See application file for complete search history.

(56) References Cited

U.S. PATENT DOCUMENTS

| | | | |
|---|---|---|---|
| 4,758,473 A * | 7/1988 | Herscovici | H01M 4/96 252/510 |
| 6,251,308 B1 | 6/2001 | Butler | |
| 2011/0024287 A1* | 2/2011 | Zheng | C02F 1/46109 204/242 |
| 2013/0266849 A1* | 10/2013 | Hara | H01M 4/364 429/179 |

FOREIGN PATENT DOCUMENTS

| | | |
|---|---|---|
| WO | 13/059056 A1 | 4/2013 |
| WO | 14/022074 A1 | 2/2014 |

* cited by examiner

*Primary Examiner* — Ladan Mohaddes
(74) *Attorney, Agent, or Firm* — McDonnell Boehnen Hulbert & Berghoff LLP (57) ABSTRACT

An electrode and a method of manufacturing an electrode for a flowing electrolyte battery enable improved robustness and reduced manufacturing costs of bipolar electrodes for flowing electrolyte batteries. The electrode includes a polymer sheet having a first side and a second side; a graphite layer on the first side; and an activated carbon layer on the second side.

13 Claims, 13 Drawing Sheets

BIPOLAR BATTERY ELECTRODE HAVING IMPROVED CARBON SURFACES AND METHOD OF MANUFACTURING SAME

This application is a US national phase of International Application No. PCT/AU2015/050076 filed on Feb. 25, 2015, which claims priority to Australian Patent Application No. 2014900628 filed on Feb. 26, 2014, which are hereby incorporated by reference in their entirety.

FIELD OF THE INVENTION

The present invention relates to battery electrodes. In particular, although not exclusively, the present invention relates to bipolar battery electrodes for flowing electrolyte batteries.

BACKGROUND TO THE INVENTION

Batteries used in stand alone power supply systems are commonly lead-acid batteries. However, lead-acid batteries have limitations in terms of performance and environmental safety. For example, typical lead-acid batteries often have very short lifetimes in hot climate conditions, especially when they are occasionally fully discharged. Lead-acid batteries are also environmentally hazardous, since lead is a major component of lead-acid batteries and can cause serious environmental problems during manufacturing and disposal.

Flowing electrolyte batteries, such as zinc-bromine batteries, zinc-chlorine batteries, and vanadium flow batteries, offer a potential to overcome the above mentioned limitations of lead-acid batteries. In particular, the useful lifetime of flowing electrolyte batteries is not affected by deep discharge applications, and the energy to weight ratio of flowing electrolyte batteries is up to six times higher than that of lead-acid batteries.

A flowing electrolyte battery, like a lead acid battery, comprises a stack of cells that produce a total voltage higher than that of the individual cells. But unlike a lead acid battery, cells in a flowing electrolyte battery are hydraulically connected through an electrolyte circulation path.

Figure 1:
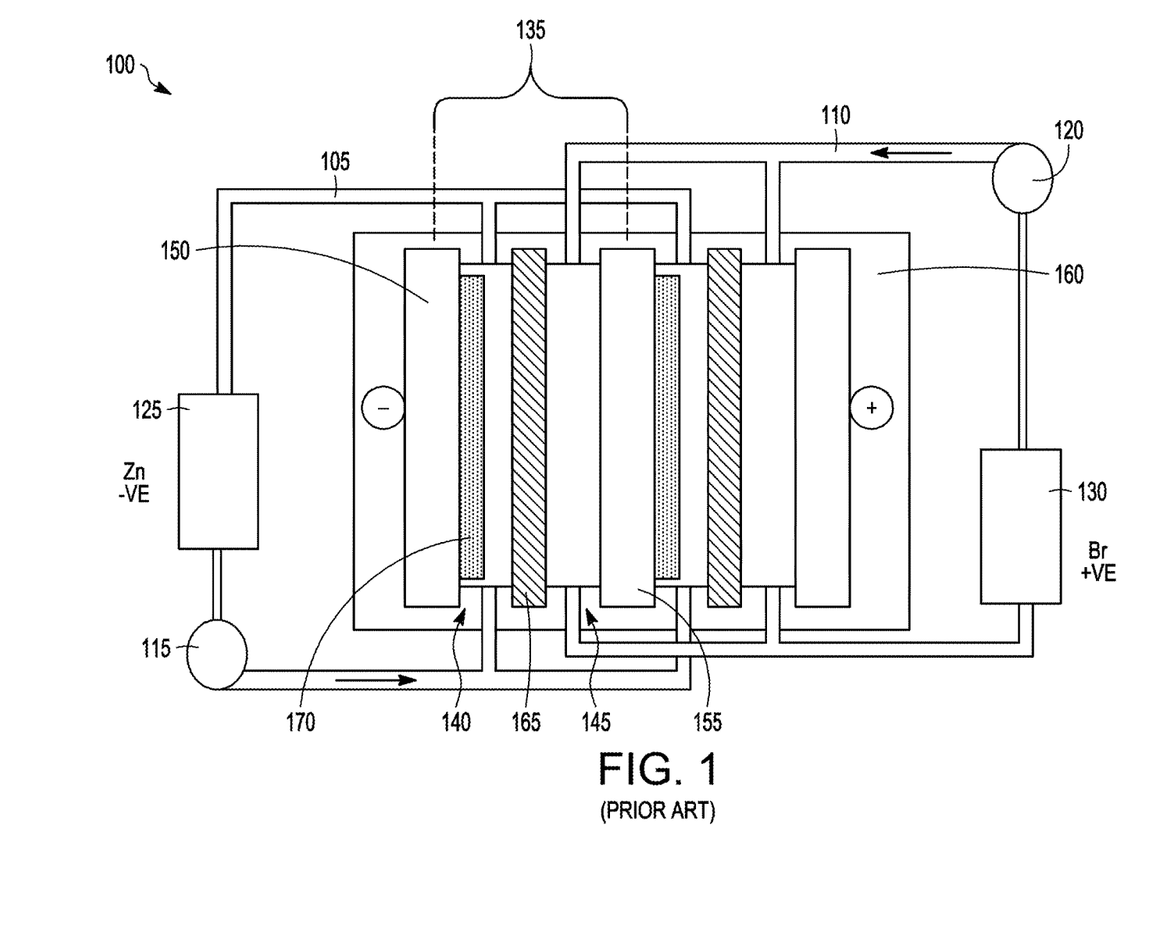
FIG. 1 is a diagram illustrating a basic zinc-bromine flowing electrolyte battery, as known according to the prior art.

Referring to FIG. 1, a flow diagram illustrates a basic zinc-bromine flowing electrolyte battery 100, as known according to the prior art. The zinc-bromine battery 100 includes a negative electrolyte circulation path 105 and an independent positive electrolyte circulation path 110. The negative electrolyte circulation path 105 contains zinc ions as an active chemical, and the positive electrolyte circulation path 110 contains bromine ions as an active chemical. The zinc-bromine battery 100 also comprises a negative electrolyte pump 115, a positive electrolyte pump 120, a negative zinc electrolyte (anolyte) tank 125, and a positive bromine electrolyte (catholyte) tank 130.

To obtain high voltage, the zinc-bromine battery 100 further comprises a stack of cells connected in a bipolar arrangement. For example, a cell 135 comprises half cells 140, 145 including a bipolar electrode plate 155 and a micro porous separator plate 165. The zinc-bromine battery 100 then has a positive polarity end at a collector electrode plate 160, and a negative polarity end at another collector electrode plate 150.

A chemical reaction in a positive half cell, such as the half cell 145, during charging can be described according to the following equation:

$$2Br^- \rightarrow Br_2 + 2e^- \qquad \text{Eq. 1}$$

Bromine is thus formed in half cells in hydraulic communication with the positive electrolyte circulation path 110 and is then stored in the positive bromine electrolyte tank 130. A chemical reaction in a negative half cell, such as the half cell 140, during charging can be described according to the following equation:

$$Zn^{2+} + 2e^- \rightarrow Zn \qquad \text{Eq. 2}$$

A metallic zinc layer 170 is thus formed on the collector electrode plate 150 in contact with the negative electrolyte circulation path 105. Chemical reactions in the half cells 140, 145 during discharging are then the reverse of Eq. 1 and Eq. 2.

Some prior art electrode plates are manufactured from polymers mixed with conductive fillers, such as graphite or carbon black. The polymer and the conductive filler are mixed at a relatively high temperature and pressed or extruded into a desired shape, typically a sheet. Activated carbon particles or activated carbon cloth or felt is then heat bonded onto the sheet to provide a large conductive surface area. Activated carbon granules may also be attached with conductive adhesive and heat curing. For zinc-bromide or zinc-chloride batteries the cathode is prepared as described above. On the anode where zinc metal is plated during charging, the conductive plastic polymer also serves as the electrode surface for the zinc plating process.

However, a problem with electrode plates manufactured from polymers mixed with conductive fillers is that the surface conductivity of the conductive mix can significantly degrade over time. This can, for example, be due to thermal factors, or due to the acidic or oxidative nature of an electrolyte and the associated electrochemical reactions. To extend the life of these electrodes, increased loadings of conductive filler must be added to what is otherwise needed on new electrodes. This makes the process of manufacturing the sheet more difficult and results in a trade-off of mechanical toughness against the increased carbon loading. Also, this leads to a second problem with these types of electrode plates which concerns a high cost associated with conductive fillers and the plate manufacturing process.

Another example of a prior art bipolar electrode for a flowing electrolyte battery is described in international patent application no. PCT/AU00/00241 to Hagg et al (International Publication no. WO 00/57507). Hagg et al describe an electrode manufactured using an alternative process involving a non-conductive polymer. Pieces of graphite felt are pressed onto both sides of a non-conductive polymer sheet such that the pieces of felt make contact with each other in the middle of the sheet. However, this method has the disadvantage that oxidation can occur at contact points of the felt, which contact points are where graphite fibres of the graphite felt extending from opposite sides of the polymer sheet contact each other in the middle of the sheet. For zinc-bromide battery applications, the zinc plating surface must be smooth and of uniform conductivity to facilitate acceptable zinc plating quality. In this example, the zinc side felt would have to be pressed fully into the non-conductive polymer. This leads to poor zinc plating quality because the conductivity of the surface is not uniform enough due to the relatively large dimensions of the fibres.

There is therefore a need to overcome or alleviate many of the above discussed problems associated with flowing electrolyte batteries of the prior art.

OBJECT OF THE INVENTION

Therefore, an object of the present invention is to overcome or alleviate one or more limitations of the prior art including providing improved battery electrodes and to reduce manufacturing costs.

SUMMARY OF THE INVENTION

According to one aspect, the present invention resides in an electrode for a flowing electrolyte battery, comprising:
a polymer sheet having a first side and a second side;
a graphite layer on the first side; and
an activated carbon layer on the second side.

Preferably, the electrode includes a graphite layer on both the first side and the second side.

Preferably, the electrode includes an activated carbon layer on both the first side and the second side.

Preferably, the activated carbon layer is on top of a graphite layer on the second side.

Preferably, the activated carbon layer and the graphite layer are removed from a milled edge of the second side of the polymer sheet.

Preferably, the polymer sheet is bonded to a polymer frame, wherein a polymer of the polymer frame bonds to the milled edge of the polymer sheet.

Preferably, 0.5 to 25 grams of graphite per 1000 $cm^2$ are on the first side of the electrode.

Preferably, 1 to 10 grams of graphite per 1000 $cm^2$ are on the first side of the electrode.

Preferably, 3 to 7 grams of graphite per 1000 $cm^2$ are on the first side of the electrode.

Preferably, the graphite is a powder having a particle size between 0.1 and 500 microns in diameter.

Preferably, the graphite is a powder having a particle size between 10 and 200 microns in diameter.

Preferably, the graphite is a powder having a particle size between 50 and 150 microns in diameter.

Preferably, 0.5 to 50 grams of activated carbon per 1000 $cm^2$ are on the second side of the electrode.

Preferably, 5 to 20 grams of activated carbon per 1000 $cm^2$ are on the second side of the electrode.

Preferably, 10 to 14 grams of activated carbon per 1000 $cm^2$ are on the second side of the electrode.

Preferably, the activated carbon is manufactured from one or more of the following: coconut shells, hardwood charcoal, bamboo charcoal, coal, and carbon black.

Preferably, said polymer sheet comprises polyethylene made conductive by mixing it with conductive fillers.

According to another aspect, the present invention resides in a method of manufacturing an electrode for a flowing electrolyte battery, the method comprising:
coating a first side of a polymer sheet with a layer of graphite; and
coating a second side of the polymer sheet with a layer of activated carbon.

Preferably, the method further comprises coating the second side of the polymer sheet with a layer of graphite before coating the second side with the layer of activated carbon.

Preferably, the method further comprises pressing the polymer sheet including both the graphite and the activated carbon in a hot press.

Preferably, a temperature inside the hot press is between 130 and 280 degrees Celsius.

Preferably, a temperature inside the hot press is between 150 and 230 degrees Celsius.

Preferably, a temperature inside the hot press is between 190 and 210 degrees Celsius.

Preferably, a pressure inside the hot press is 5 to 1000 bar.

Preferably, a pressure inside the hot press is 50 to 500 bar.

Preferably, a pressure inside the hot press is 80 to 120 bar.

Preferably, the pressure inside the hot press is applied for 10 to 240 seconds.

Preferably, the pressure inside the hot press is applied for 40 to 150 seconds.

Preferably, the pressure inside the hot press is applied for 50 to 70 seconds.

Preferably, the method further comprises pressing the polymer sheet including both the graphite and the activated carbon in a cold press subsequent to pressing in the hot press.

Preferably, a temperature inside the cold press is between 10 and 70 degrees Celsius.

Preferably, a temperature inside the cold press is between 20 and 60 degrees Celsius.

Preferably, a temperature inside the cold press is between 30 and 40 degrees Celsius.

Preferably, a pressure inside the cold press is 10 to 1000 bar.

Preferably, a pressure inside the cold press is 50 to 500 bar.

Preferably, a pressure inside the cold press is 80 to 120 bar.

Preferably, the pressure inside the cold press is applied for 10 to 240 seconds.

Preferably, the pressure inside the cold press is applied for 40 to 150 seconds.

Preferably, the pressure inside the cold press is applied for 50 to 70 seconds.

Preferably, the method further comprises positioning a sheet of release paper adjacent the first side of the polymer sheet and positioning another sheet of release paper adjacent the second side of the polymer sheet during pressing of the polymer sheet.

Preferably, the method further comprises removing the layer of activated carbon from an edge of the second side of the polymer sheet.

Preferably, the method further comprises removing the layer of graphite and the layer of activated carbon from an edge of the second side of the polymer sheet.

Preferably, the method further comprises removing the layer of graphite from an edge of the first side of the polymer sheet.

Preferably, removing the layer of graphite and the layer of activated carbon from the edge of the second side of the polymer sheet is performed by milling the polymer sheet subsequent to pressing the polymer sheet in the hot press and the cold press.

Preferably, coating the second side of the polymer sheet with the layer of activated carbon comprises mixing activated carbon into a solution of a polyvinylidene difluoride (PVDF) binder polymer dissolved in a solvent and spraying the solution onto the polymer sheet.

Preferably, the activated carbon may be mixed into a solution of any suitable binder polymer.

Preferably, 0.5 to 50 grams of activated carbon per 1000 $cm^2$ of polymer sheet is mixed into the solution of the PVDF binder polymer.

Preferably, 5 to 20 grams of activated carbon per 1000 $cm^2$ of polymer sheet is mixed into the solution of the PVDF binder polymer.

Preferably, 10 to 14 grams of activated carbon per 1000 cm² of polymer sheet is mixed into the solution of the PVDF binder polymer.

Preferably, the PVDF binder is mixed to a ratio of 1 to 20% by mass of the activated carbon powder.

Preferably, the PVDF binder is mixed to a ratio of 4 to 16% by mass of the activated carbon powder.

Preferably, the PVDF binder is mixed to a ratio of 8 to 12% by mass of the activated carbon powder.

Preferably, the method further comprises insert moulding a frame around a perimeter of the polymer sheet.

Preferably, insert moulding the frame around the perimeter of the polymer sheet comprises bonding a polymer of the frame to the edge of the second side of the polymer sheet where the layer of graphite and the layer of activated carbon are removed.

Preferably, laser, vibration, ultrasonic or heat welding may be used to insert mould the frame around the perimeter of the polymer sheet.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

Those skilled in the art will appreciate that minor deviations from the symmetrical layout of components as illustrated in the drawings will not detract from the proper functioning of the disclosed embodiments of the present invention.

DETAILED DESCRIPTION OF THE INVENTION

Embodiments of the present invention comprise a bipolar electrode for a flowing electrolyte battery. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

FIGS. 2 through 13 illustrate a production process of a bipolar electrode plate, according to some embodiments of the present invention.

Figure 2:
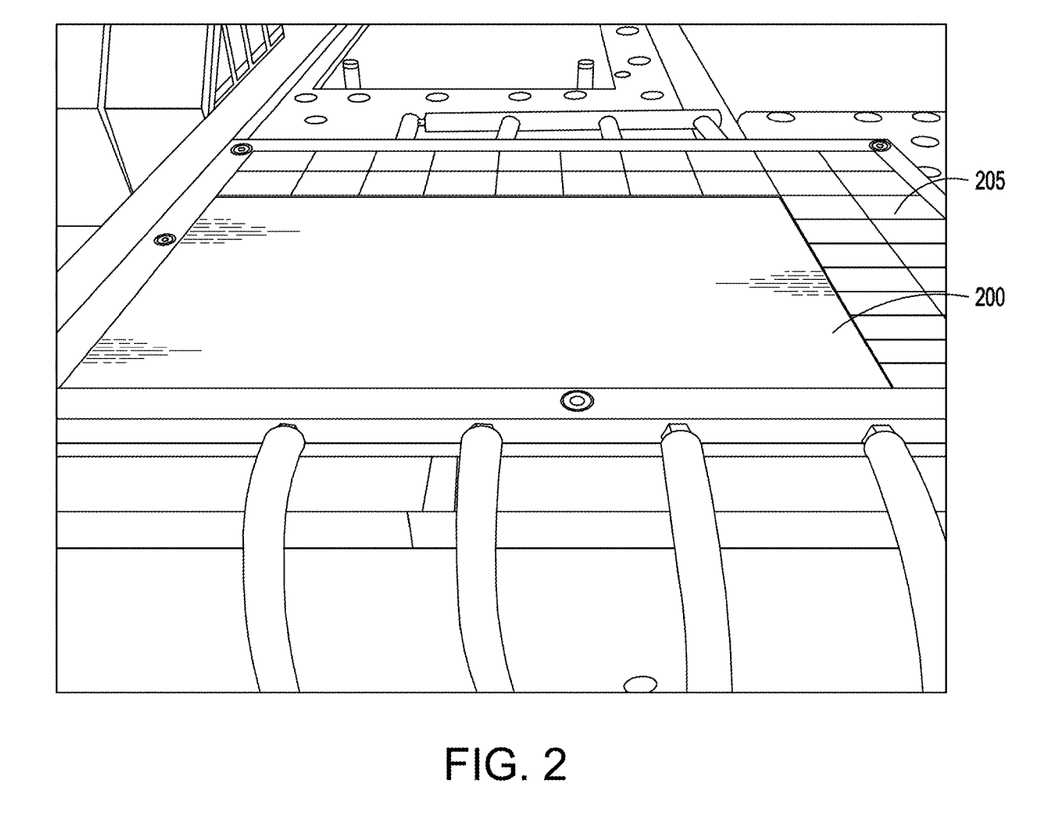
FIG. 2 illustrates the initial processing of a conductive polymer sheet used to form an electrode, according to an embodiment of the present invention.

FIG. 2 illustrates the initial processing of a conductive polymer sheet 200 used to form an electrode. The sheet 200, made for example of carbon filled polyethylene or another suitable polymer, is secured to a vacuum table 205 and machined to a desired thickness. Typical dimensions for example may include a sheet 200 having an area on one side of 1000 cm² and that is milled to a thickness of 0.8 mm. To assist in later processing, as described below, a narrow step is left around the perimeter of the sheet 200 such that the thickness at the perimeter is about 1.1 mm.

Figure 3:
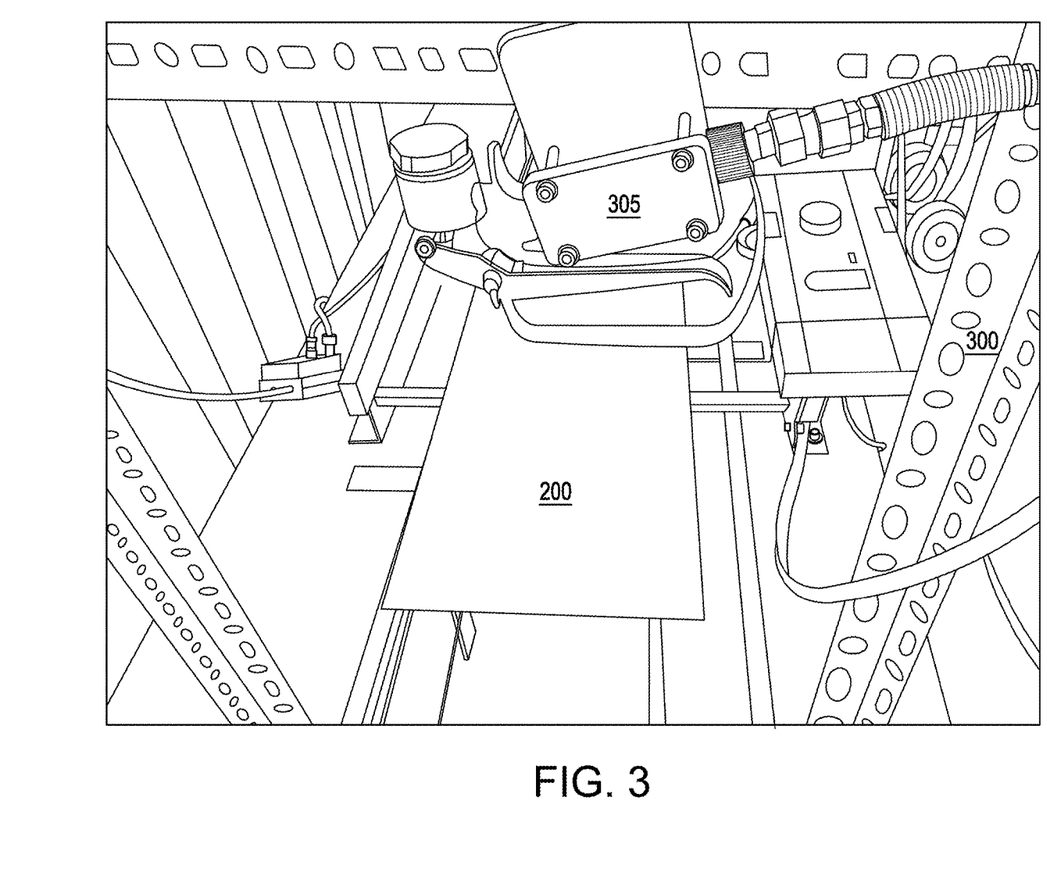
FIG. 3 illustrates the sheet of FIG. 2 in a spray booth, according to an embodiment of the present invention.

FIG. 3 illustrates the sheet 200 in a spray booth 300. Subsequent to the machining described above, a graphite layer is sprayed onto both a first side (which will become the anode or "zinc" side of the bipolar electrode) and a second side (which will become the cathode or "bromine" side of the bipolar electrode) of the sheet 200. For example, on a sheet 200 having an active surface area of 240 mm×440 mm per side, approximately 0.5 to 25 grams and preferably 5 grams of graphite powder having a particle size between 0.1 and 500 microns and preferably 100 microns per side are mixed into a solution of polyvinylidene difluoride (PVDF) binder polymer dissolved in a solvent and sprayed onto the anode side and optionally also sprayed onto the cathode side of the sheet 200 using a spray gun 305. Alternatively, those having ordinary skill in the art will appreciate that other means for coating both the anode side and the cathode side with graphite, such as a dip coating process, can be used.

Next, after the optional application of the graphite to the cathode side, an activated carbon layer is also sprayed onto the cathode side of the sheet 200. For example, approximately 0.5 to 50 grams per 1000 cm$^2$ of polymer sheet and preferably 12 grams of an activated carbon is mixed into a solution of a small amount of PVDF binder polymer dissolved in a solvent and sprayed onto the sheet 200. The PVDF binder should be mixed to a ratio of 1 to 20% by mass of the activated carbon powder and preferably 10%. An activated carbon such as carbon manufactured from coconut shells, which is readily commercially available for various gas purification and metal extraction applications, includes small pores having a very high surface area which enable such carbon to be very effective for the adsorption of gas and vapours and the catalysation of the bromine reaction. Applying the activated carbon on top of the graphite prevents the activated carbon from sinking unevenly into the polyethylene during hot pressing and enables the activated carbon to be more uniformly distributed across the surface of the cathode side of the sheet 200. Because the activated carbon or other surface coating does not sink into the graphite surface, less material is needed as none is lost into the plastic.

Alternatively, as will be understood by those having ordinary skill in the art, various other forms of activated carbon may be used such as hardwood charcoal, bamboo charcoal, coal, or carbon black. Furthermore, various other suitable catalysing materials can be applied to the activated carbon or directly to the graphite layer.

Figure 4:
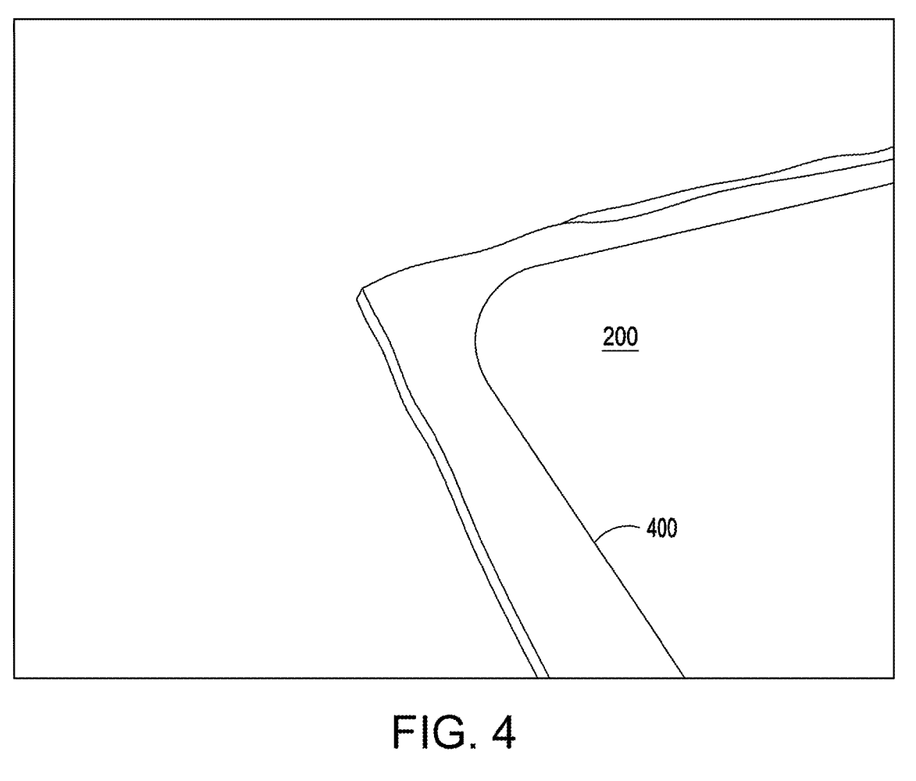
FIG. 4 illustrates a close up view of a cathode side of the sheet of FIG. 2, following application of a graphite layer and an activated carbon layer, according to an embodiment of the present invention.

FIG. 4 illustrates a close up view of the cathode side of the sheet 200, following application of the activated carbon. The line 400 demarcates the thick edge of the sheet 200 that is approximately 0.3 mm thicker than the remainder of the sheet 200. This thicker perimeter edge is also evenly coated with activated carbon.

Figure 5:
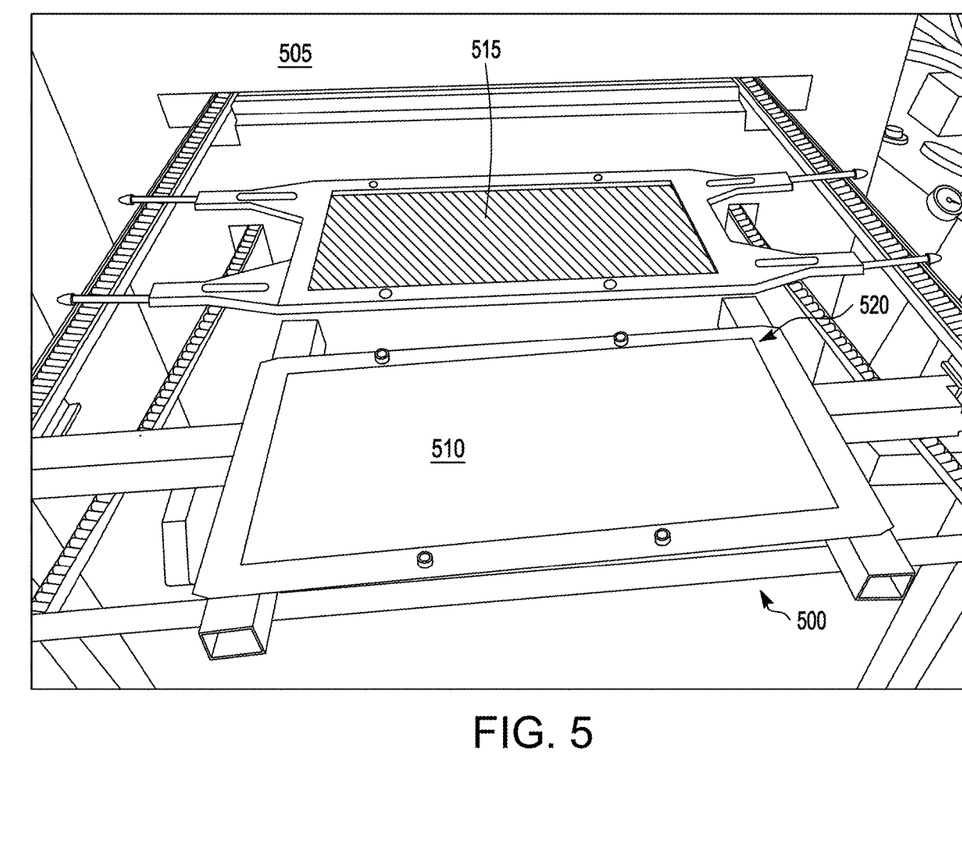
FIG. 5 illustrates a mould that is used to press a polymer sheet in a hot press, according to an embodiment of the present invention.

FIG. 5 illustrates a mould 500 that is used to press the sheet 200 in a hot press 505 following application of the carbon to both sides of the sheet 200. A lid 510 of the mould 500 is shown in the foreground and a base 515 is shown in the background. An edge 520 of the lid 510 is recessed by approximately 0.3 mm. That ensures that an even pressure is applied to the entire active surface of both sides of the sheet 200 during the pressing process described below, and corresponds with the 0.3 mm additional thickness around the perimeter of the sheet 200.

Figure 6:
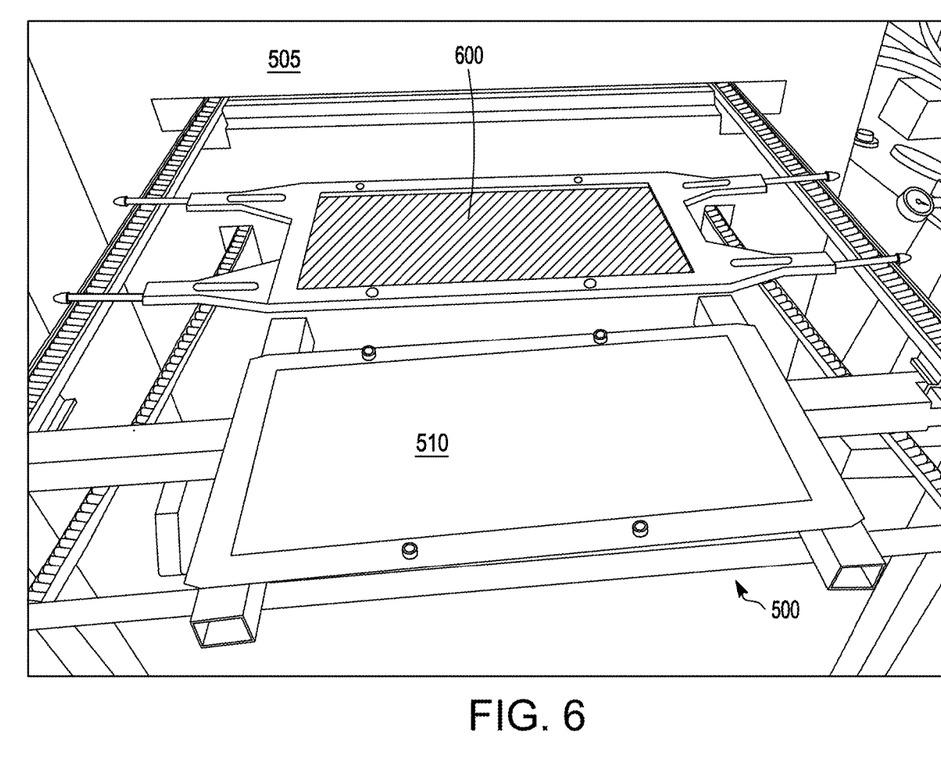
FIG. 6 illustrates the mould of FIG. 5 showing a first sheet of release paper placed on a base of the mould, according to an embodiment of the present invention.

FIG. 6 illustrates the mould 500 of FIG. 5 showing a first sheet 600 of release paper placed on the base 515. The release paper can include, for example, simple parchment paper or "baking" paper. Sheets of Teflon or other non-stick material also can be used; however Teflon sheets do not last long and are expensive, whereas parchment paper is inexpensive and can be discarded after a single use.

Further, the fibres of the parchment paper, when pressed against the sheet 200 as described below, produce a textured surface on the graphite of the anode side of the sheet 200. The textured surface enables zinc to better adhere to the graphite during charging of a battery that employs the sheet 200 as a bipolar electrode.

Figure 7:
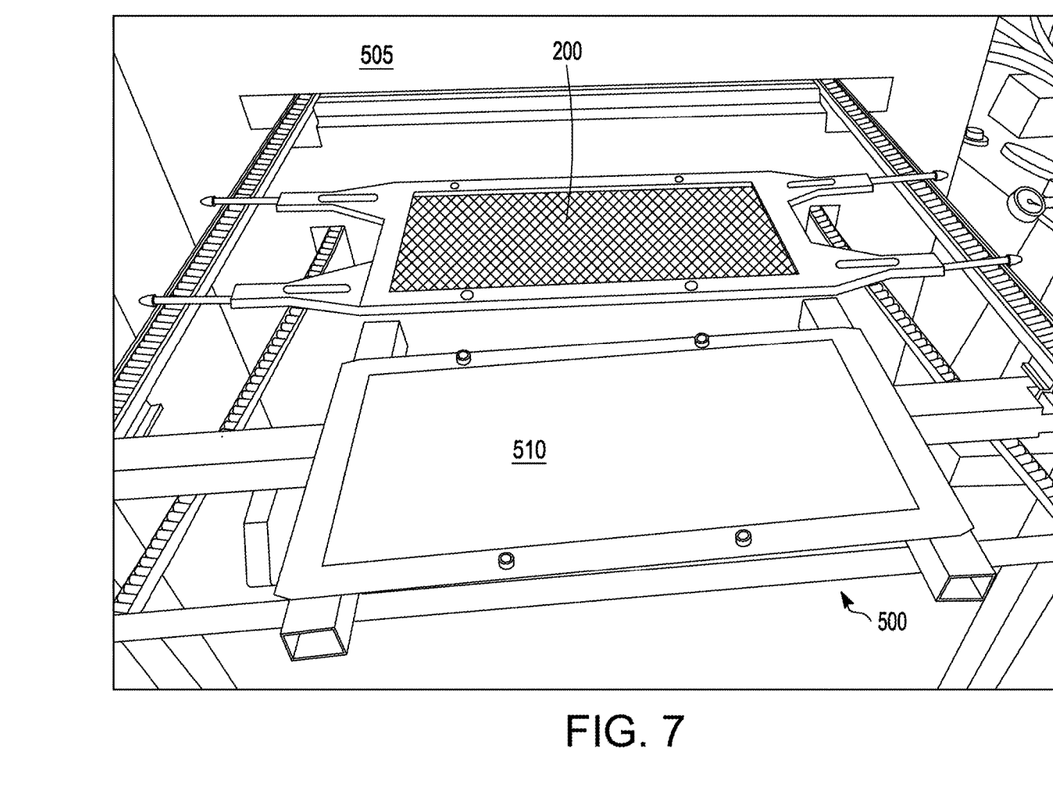
FIG. 7 illustrates the mould of FIG. 6 showing the conductive polymer sheet of FIG. 4 placed over the top of the first sheet of release paper, according to an embodiment of the present invention.

FIG. 7 illustrates the mould 500 of FIG. 6 showing the conductive polymer sheet 200 placed over the top of the first sheet 600 of release paper.

Figure 8:
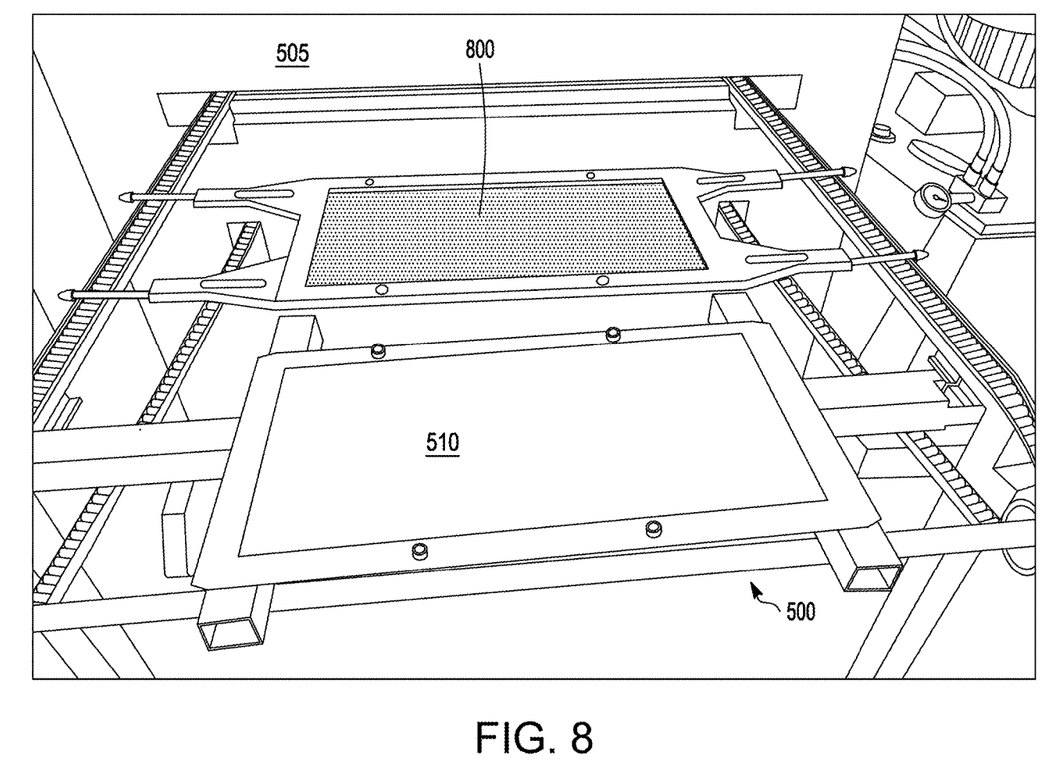
FIG. 8 illustrates the mould of FIG. 7 showing a second sheet of release paper placed over the top of the conductive polymer sheet, according to an embodiment of the present invention.

FIG. 8 illustrates the mould 500 of FIG. 7 showing a second sheet 800 of release paper placed over the top of the conductive polymer sheet 200.

Figure 9:
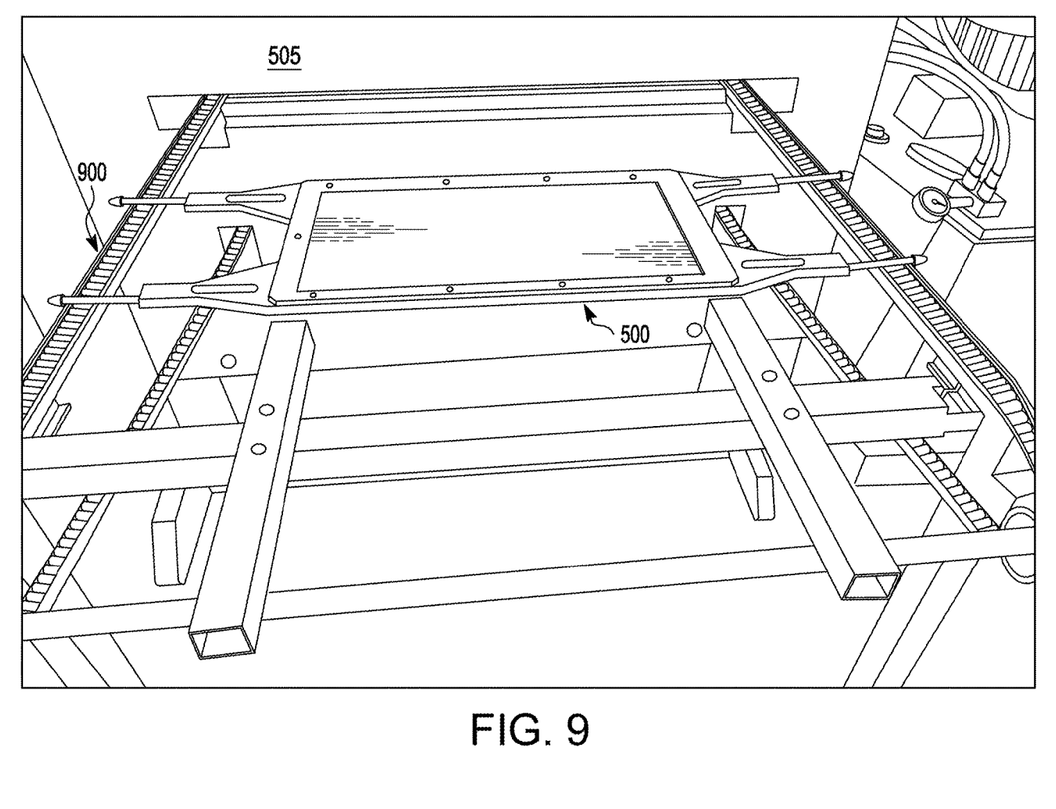
FIG. 9 illustrates the mould of FIG. 8 assembled and showing a lid placed over the top of a base of the mould, according to an embodiment of the present invention.

FIG. 9 illustrates the mould 500 of FIG. 8 showing the lid 510 placed over the top of the base 515. The assembled mould 500 thus now includes a layered stack of, from bottom up, the base 515, the first sheet 600 of release paper, the conductive polymer sheet 200, the second sheet 800 of release paper, and the lid 510. Next, the mould 500 is rolled along a conveyor 900 into the hot press 505.

Figure 10:
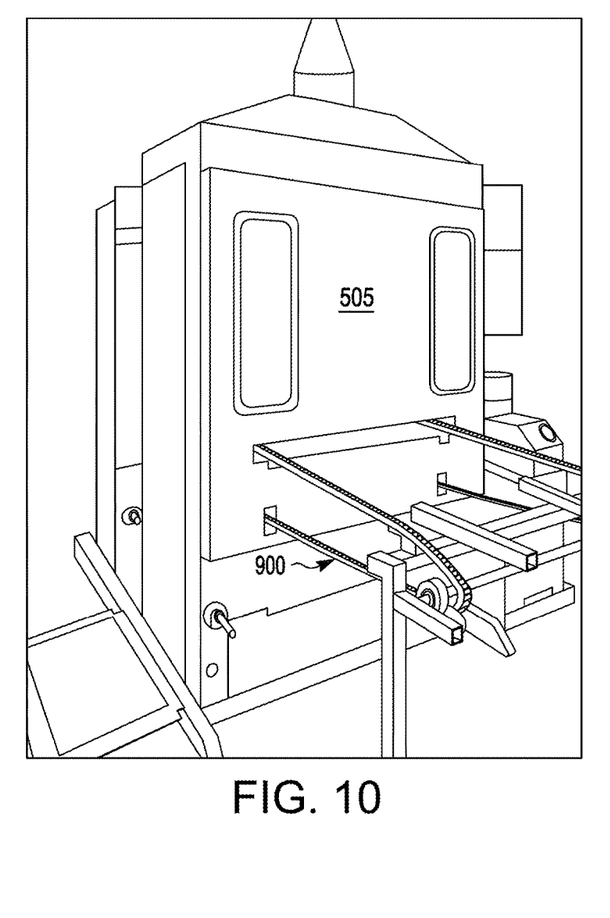
FIG. 10 illustrates a hot press with the assembled mould of FIG. 9, according to an embodiment of the present invention.

FIG. 10 illustrates the hot press 505 with the assembled mould 500 including the above described layered stack inside. The temperature in the press can be set to approximately 130 to 280 degrees Celsius and preferably 200 degrees Celsius such that the polymer plate and the PVDF binder is softened, and 5 to 1000 bar and optimally 100 bar pressure is evenly applied to the assembled mould 500 for 10 to 240 seconds and preferably 60 seconds.

On the anode side of the sheet 200 the hot press 505 results in a smooth graphite plate comprising bonded graphite flakes having low porosity. Further, the activated carbon on the cathode side of the sheet 200 is rendered more robust.

Figure 11:
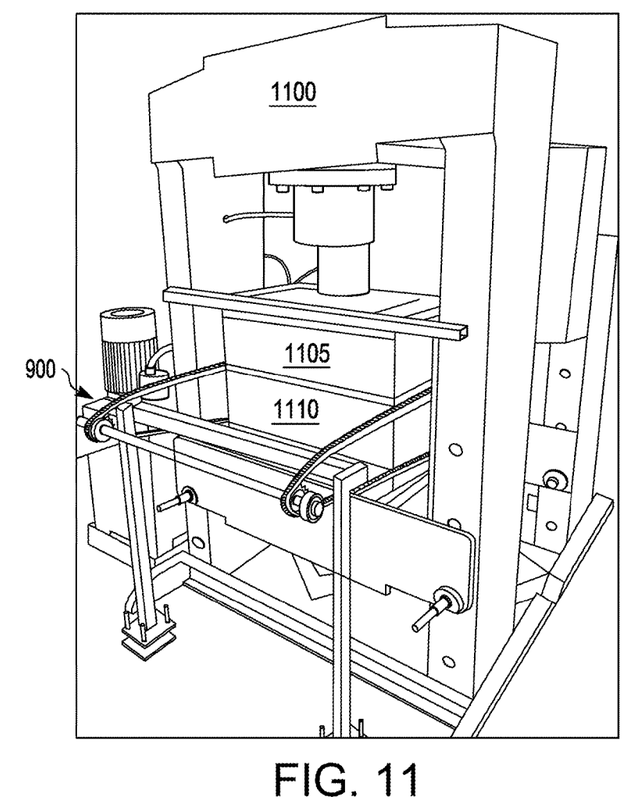
FIG. 11 illustrates a cold press that is positioned adjacent to the hot press of FIG. 10, according to an embodiment of the present invention.

FIG. 11 illustrates a cold press 1100, that is positioned adjacent the hot press 505, and along the conveyer 900. After being pressed in the hot press 505, the assembled mould 500 including the above described layered stack is rolled along the conveyer 900 and into the cold press 1100. Inside the cold press 1100, water cooled press blocks 1105, 1110 at 10 to 70 degrees Celsius and preferably 35 degrees Celsius apply a similar pressure as applied in the hot press 505 to the assembled mould 500 for a similar time compared with the hot press.

Figure 12:
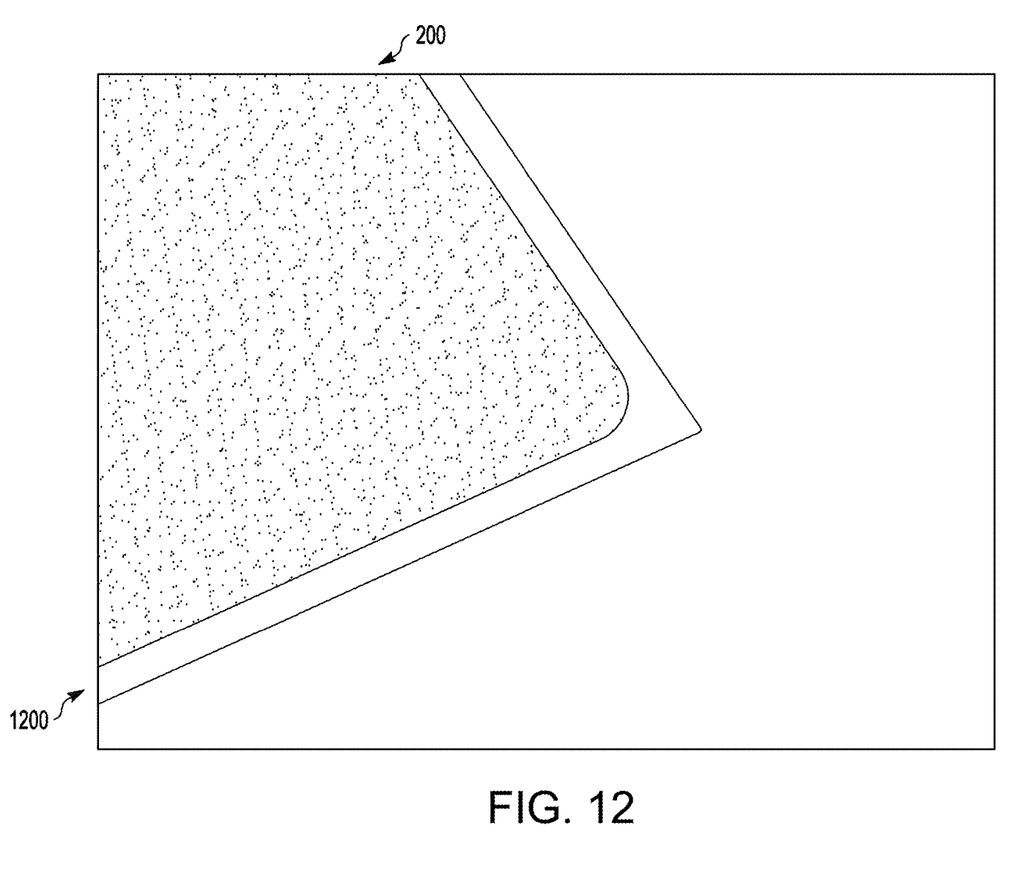
FIG. 12 illustrates the cathode side of the conductive polymer sheet of FIG. 7 after it has been removed from the cold press, separated from the sheets of release paper, and processed in a computerised numerical control (CNC) milling machine (not shown), according to an embodiment of the present invention.

FIG. 12 illustrates the cathode side of the conductive polymer sheet 200 after it has been removed from the cold press 1100, separated from the sheets 600, 800 of release paper, and processed in a computerised numerical control (CNC) milling machine (not shown). The CNC milling machine mills the thick edge (as demarcated by the line 400 shown in FIG. 4) on the cathode side of the sheet 200. That produces a uniform thickness of approximately 1.0 mm across the entire sheet 200, including a milled edge 1200 where the activated carbon has been milled away leaving an uncoated surface of carbon filled polyethylene.

The uncoated surface of carbon filled polyethylene at the milled edge 1200 provides an effective bonding surface on which to attach a plastic frame to the sheet 200. Also, removal of the activated carbon on the milled edge 1200 causes zinc plating (which occurs during charging of a completed battery) on the anode side of the sheet 200 to end at a line on the graphite of the anode side precisely opposite the milled edge 1200. That avoids potential dendrite growth sites on the electrode edges. Following the CNC milling, the sheet 200 is thus ready to be framed and then assembled into a flowing electrolyte battery.

Figure 13:
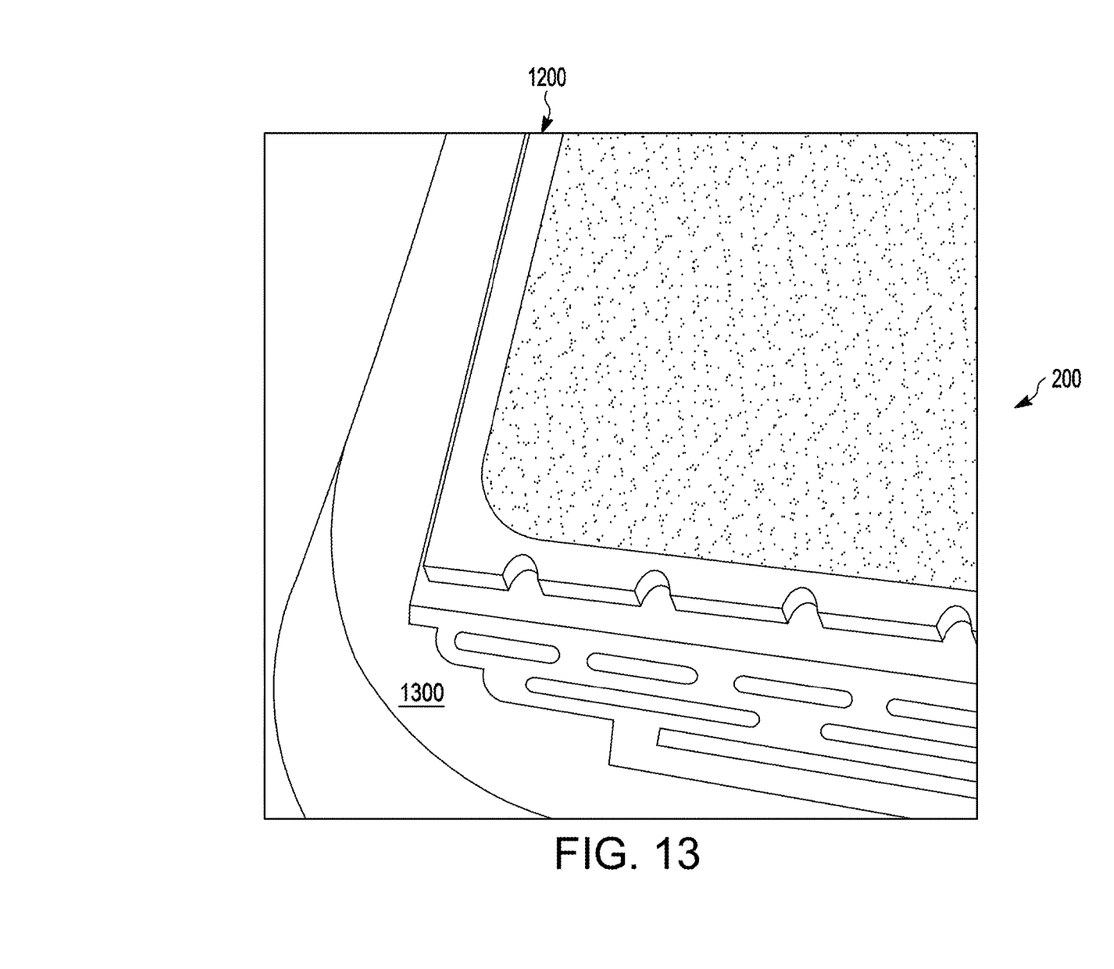
FIG. 13 illustrates the cathode side of the conductive polymer sheet of FIG. 12 after it has been framed by an insert moulding process, according to an embodiment of the present invention.

FIG. 13 illustrates the cathode side of the conductive polymer sheet 200 after it has been framed. A frame 1300 is insert moulded around the sheet 200. The milled edge 1200 that exposes the carbon filled polyethylene of the sheet 200 bonds well to the frame 1300 that can comprise, for example, glass filled polyethylene.

In summary, advantages of some embodiments of the present invention include improved robustness and reduced manufacturing costs of bipolar electrodes for flowing electrolyte batteries. Also, as the conductive polymer sheet of an electrode of the present invention can be sealed in a coating of graphite, the possibility of using alternative, non-inert plastics such as softened polyvinyl chloride (PVC) as the conductive polymer sheet is now feasible. A zinc electrode surface consisting of a film of graphite provides an excellent base for high quality zinc plating. Further, such a graphite film is very robust and resists oxidation and corrosion processes far better than the conductive polymer generally used in the prior art. Also, following the teachings of the present invention the conductive plate can be optimised for properties such as toughness and bulk conductivity rather than as a base for high quality zinc plating. Further, electrically conductive fibres pressed into a non-conducting plate coated with a film of graphite provide an excellent base for high quality zinc plating, as the graphite equalises the uneven conductivity of the conductive fibres. The performance of bipolar electrodes manufactured according to the teachings of the present invention are thus less susceptible to degradation and are generally mechanically superior to electrodes of the prior art.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A method of manufacturing an electrode for a flowing electrolyte battery, the method comprising:
    coating a first side of a polymer sheet with a layer of graphite;
    coating a second side of the polymer sheet with a layer of graphite and a layer of activated carbon, wherein the layer of activated carbon is on top of the layer of graphite on the second side;
    pressing the polymer sheet, including both the layer of graphite and the layer of activated carbon, in a hot press;
    pressing the polymer sheet, including both the layer of graphite and the layer of activated carbon, in a cold press subsequent to pressing in the hot press; and
    removing the layer of activated carbon and the layer of graphite from a milled edge of the second side of the polymer sheet.

2. The method of claim 1, wherein a temperature inside the hot press is between 130 and 280 degrees Celsius.

3. The method of claim 1, wherein a pressure inside the hot press is 10 to 1000 bar.

4. The method of claim 1, further comprising positioning a sheet of release paper adjacent the first side of the polymer sheet and positioning another sheet of release paper adjacent the second side of the polymer the polymer sheet during the pressing of the polymer sheet.

5. The method of claim 1, further comprising coating the first side of the polymer sheet with a layer of activated carbon.

6. The method of claim 1, further comprising bonding the polymer sheet to a polymer frame.

7. The method of claim 1, wherein 0.5 to 25 grams of graphite per 1000 cm2 of surface area of the layer of graphite are coated on the first side of the electrode.

8. The method of claim 1, wherein graphite in the layer of graphite is a powder having a particle size between 0.1 and 500 microns in diameter.

9. The method of claim 1, wherein graphite in the layer of graphite is a powder having a particle size between 10 and 200 microns in diameter.

10. The method of claim 1, wherein graphite in the layer of graphite is a powder having a particle size between 50 and 150 microns in diameter.

11. The method of claim 1, wherein 0.5 to 50 grams of activated carbon per 1000 cm2 of surface area of the layer of activated carbon are coated on the second side of the electrode.

12. The method of claim 1, wherein the layer of activated carbon is manufactured from one or more of the following: coconut shells, hardwood charcoal, bamboo charcoal and carbon black.

13. The method of claim 1, wherein the polymer sheet comprises polyethylene made conductive by mixing it with conductive fillers.

* * * * *